US012767538B2

(12) United States Patent
Shibuya et al.

(10) Patent No.: US 12,767,538 B2
(45) **Date of Patent: *Oct. 20, 2026**

(54) CARBON NANOTUBE ASSEMBLY

(71) Applicant: ZEON CORPORATION, Tokyo (JP)

(72) Inventors: Akiyoshi Shibuya, Tokyo (JP); Tomoko Yamagishi, Tokyo (JP)

(73) Assignee: ZEON CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 19/178,871

(22) Filed: Apr. 15, 2025

(65) Prior Publication Data

US 2025/0243066 A1 Jul. 31, 2025

Related U.S. Application Data

(62) Division of application No. 17/904,292, filed as application No. PCT/JP2021/005571 on Feb. 15, 2021, now Pat. No. 12,384,681.

(30) Foreign Application Priority Data

Feb. 28, 2020 (JP) ................................ 2020-034307

(51) Int. Cl.
*C01B 32/162* (2017.01)

(52) U.S. Cl.
CPC ........ *C01B 32/162* (2017.08); *C01B 2202/08* (2013.01); *C01B 2202/34* (2013.01); *C01P 2002/82* (2013.01); *C01P 2002/90* (2013.01); *C01P 2004/03* (2013.01); *C01P 2006/14* (2013.01); *C01P 2006/16* (2013.01)

(58) Field of Classification Search
CPC .............. C01B 32/162; C01B 2202/08; C01B 2202/34; C01B 2202/36; C01B 32/164; C01B 32/158; C01B 32/16; C01B 32/174; C01B 2202/32; C01P 2002/82; C01P 2002/90; C01P 2004/03; C01P 2006/14; C01P 2006/16; C01P 2006/11; C01P 2006/12; C01P 2006/17; C01P 2006/80
See application file for complete search history.

(56) References Cited

U.S. PATENT DOCUMENTS

| | | | |
|---|---|---|---|
| 9,795,994 | B2 | 10/2017 | Maeno |
| 10,040,686 | B2 | 8/2018 | Hata et al. |
| 11,192,789 | B2 | 12/2021 | Takai |
| 2015/0321917 | A1 | 11/2015 | Shibuya |
| 2018/0016146 | A1 | 1/2018 | Hata et al. |
| 2019/0389728 | A1 | 12/2019 | Takai |

FOREIGN PATENT DOCUMENTS

| | | | | |
|---|---|---|---|---|
| CN | 103201214 | A | 7/2013 | |
| CN | 103974902 | A | 8/2014 | |
| CN | 110352176 | A | 10/2019 | |
| EP | 2383225 | A1 * | 11/2011 | ............ B01J 35/395 |
| JP | 2008201626 | A | 9/2008 | |
| JP | 2016108175 | A | 6/2016 | |
| JP | 2016216863 | A | 12/2016 | |
| KR | 1020190127745 | A | 11/2019 | |
| WO | 2012081601 | A1 | 6/2012 | |
| WO | 2018180901 | A1 | 10/2018 | |

OTHER PUBLICATIONS

Aug. 30, 2022, International Preliminary Report on Patentability issued in the International Patent Application No. PCT/JP2021/005571.
Dec. 11, 2024, Communication pursuant to Rule 114(2) EPC issued by the European Patent Office in the corresponding European Patent Application No. 21761426.2.
Mar. 5, 2024, the Extended European Search Report issued by the European Patent Office in the corresponding European Patent Application No. 21761426.2.
May 11, 2021, International Search Report issued in the International Patent Application No. PCT/JP2021/005571.
Apr. 2, 2025, Office Action issued by the United States Patent and Trademark Office in U.S. Appl. No. 17/904,292.

* cited by examiner

*Primary Examiner* — Anthony J Zimmer
*Assistant Examiner* — Abdul-Rahman Yusuf Waleed Smari
(74) *Attorney, Agent, or Firm* — KENJA IP LAW PC

(57) ABSTRACT

A carbon nanotube assembly satisfies at least one of the following conditions (1) to (3): (1) an FT-IR spectrum of a CNT dispersion obtained by dispersing the CNT assembly has a peak based on plasmon resonance of the CNTs in a wave number range of greater than 300 $cm^{-1}$ and 2000 $cm^{-1}$ or less; (2) the highest peak in a differential pore capacity distribution of the CNT assembly is located within a pore size range of more than 100 nm and less than 400 nm; and (3) a two-dimensional spatial frequency spectrum of an 10 electronic micrographic image of the CNT assembly has at least one peak within a range of 1 $\mu m^{-1}$ or more and 100 $\mu m^{-1}$ or less.

5 Claims, 9 Drawing Sheets

SEM image

Two-dimensional spatial frequency spectrum

SEM image

Two-dimensional spatial frequency spectrum

SEM image

Two-dimensional spatial frequency spectrum

| Example 1 | Example 2 | Comparative Example |
| --- | --- | --- |
| Homogeneous | Separated | Sedimented |

CARBON NANOTUBE ASSEMBLY

CROSS-REFERENCE TO RELATED APPLICATIONS

The present application is a divisional application of U.S. patent application Ser. No. 17/904,292 filed Aug. 16, 2022, which is a National Stage Application of PCT/JP2021/005571 filed Feb. 15, 2021, which claims priority of Japanese Patent Application No. 2020-034307 filed Feb. 28, 2020. The disclosures of the prior applications are hereby incorporated by reference herein in their entirety.

TECHNICAL FIELD

The present disclosure relates to a carbon nanotube assembly and a production method of the same.

BACKGROUND

Carbon nanotubes (hereinafter sometimes referred to as "CNTs") have attracted attention as materials having a wide variety of excellent properties inherent to their specific structures. For example, CNTs are excellent in a wide variety of properties such as mechanical strength, optical properties, electrical properties, thermal properties, ion storage ability, and ion adsorption ability, and are expected as promising functional materials such as a material for electronic devices, a material for optical elements, and a conductive material.

CNTs have tendency to aggregate due to their properties. For enhancing the functionalities of parts which can be used in various applications, CNTs need to be homogeneously dispersed in the parts. Accordingly, various studies have therefore been made on methods for producing CNTs having an excellent dispersibility (see, for example, PTLs 1 to 3)

Specifically, PTL 1 proposes the technique related to a CNT dispersion liquid for producing CNT yarns having excellent properties, for example. Further, PTL 2 proposes the technique related to a CNT assembly composed of CNTs that can be easily loosened, for example. Further, PTL 3 proposes the technique related to a carbon nanotube assembly having high conductivity and high dispersibility, for example.

CITATION LIST

Patent Literature

PTL 1: JP 2016-216863 A
PTL 2: WO 2012/081601 A
PTL 3: JP 2008-201626 A

SUMMARY

Technical Problem

In the above-mentioned conventional techniques, however, there is still room for further improving the dispersibility of CNTs which can be achieved.

Accordingly, it would be helpful to provide a carbon nanotube assembly which has an excellent dispersibility and a production method of the same.

Solution to Problem

The present inventors have made extensive studies in order to achieve the foregoing object. The present inventors have discovered a new finding in that a carbon nanotube assembly which can satisfy at least one of certain three conditions can have an excellent dispersibility, and thus have completed the present disclosure.

That is, the present disclosure is directed to advantageously solving the above-mentioned problem, and a carbon nanotube assembly of the present disclosure satisfies at least one of the following conditions (1) to (3):

(1) a spectrum obtained by a Fourier transform infrared spectroscopic analysis on a carbon nanotube dispersion obtained by dispersing the carbon nanotube assembly so that a bundle length is 10 μm or more, has at least one peak based on plasmon resonance of the carbon nanotube dispersion in a wavenumber range of more than 300 $cm^{-1}$ and 2000 $cm^{-1}$ or less;

(2) a highest peak in a differential pore capacity distribution measured on the carbon nanotube assembly is located within a pore size range of more than 100 nm and less than 400 nm; and (3) a two-dimensional spatial frequency spectrum of an electron microscopic image of the carbon nanotube assembly has at least one peak within a range of 1 $\mu m^{-1}$ or more and 100 $\mu m^{-1}$ or less.

A carbon nanotube assembly satisfying at least one of the above-described conditions (1) to (3) can have an excellent dispersibility.

Herein, in the carbon nanotube assembly, preferably, the at least one peak based on plasmon resonance of the carbon nanotube dispersion is within a wave number range of 500 $cm^{-1}$ or more. A carbon nanotube assembly satisfying this condition may have a further excellent dispersibility.

Further, in the carbon nanotube assembly, preferably, the highest peak in the differential pore capacity distribution is 2 $cm^3/g$ or more. A carbon nanotube assembly satisfying this condition may have a further excellent dispersibility.

Preferably, the carbon nanotube assembly of the present disclosure satisfies at least two of the conditions (1) to (3). A carbon nanotube assembly satisfying this condition may have a further excellent dispersibility.

The carbon nanotube assembly of the present disclosure preferably satisfies all of the conditions (1) to (3). A carbon nanotube assembly satisfying this condition may have a further excellent dispersibility.

Further, the present disclosure is directed to advantageously solving the above-described problem, and a production method of the carbon nanotube assembly of the present disclosure is a production method of any of the carbon nanotube assemblies described above, wherein the conditions during growth of the carbon nanotube assembly satisfy all of (a) to (c) below:

(a) a growth rate of the carbon nanotube assembly is 5 μm/min or more;

(b) a concentration of a catalyst activating material in a growth atmosphere of the carbon nanotube assembly is 4 volume % or more; and (c) during growth of the carbon nanotube assembly, an obstacle is present in a growth direction of the carbon nanotubes which are to compose the carbon nanotube assembly.

According to the production method satisfying these conditions, the carbon nanotube assembly of the present disclosure described above can be efficiently produced.

Herein, in the production method of the carbon nanotube assembly of the present disclosure, preferably, the growth atmosphere comprises ethylene as a source gas, and thermal decomposition time of ethylene in the growth atmosphere is 0.5 seconds or longer and 10 seconds or shorter. According to the production method satisfying these conditions, the carbon nanotube assembly of the present disclosure can be manufactured more efficiently with higher quality.

Advantageous Effect

According to the present disclosure, a carbon nanotube assembly which has an excellent dispersibility can be provided.

DETAILED DESCRIPTION

An embodiment of the present disclosure will be described below. A carbon nanotube assembly (hereinafter, sometimes simply referred to as "CNT assembly") of the present disclosure can be efficiently produced by a production method of the present disclosure.

Herein, the carbon nanotube assembly of the present disclosure has an excellent dispersibility, and satisfies at least one of the conditions (1) to (3):

(1) a spectrum obtained by a Fourier transform infrared spectroscopic analysis on a carbon nanotube dispersion obtained by dispersing the carbon nanotube assembly such that the bundle length is 10 μm or more, has at least one peak based on plasmon resonance of the carbon nanotube dispersion in a wavenumber range of more than 300 $cm^{-1}$ and 2000 $cm^{-1}$ or less;

(2) a highest peak in a differential pore capacity distribution measured on the carbon nanotube assembly is located within a pore size range of more than 100 nm and less than 400 nm; and (3) a two-dimensional spatial frequency spectrum of an electron microscopic image of the carbon nanotube assembly has at least one peak within a range of 1 $\mu m^{-1}$ or more and 100 $\mu m^{-1}$ or less.

Figure 1:
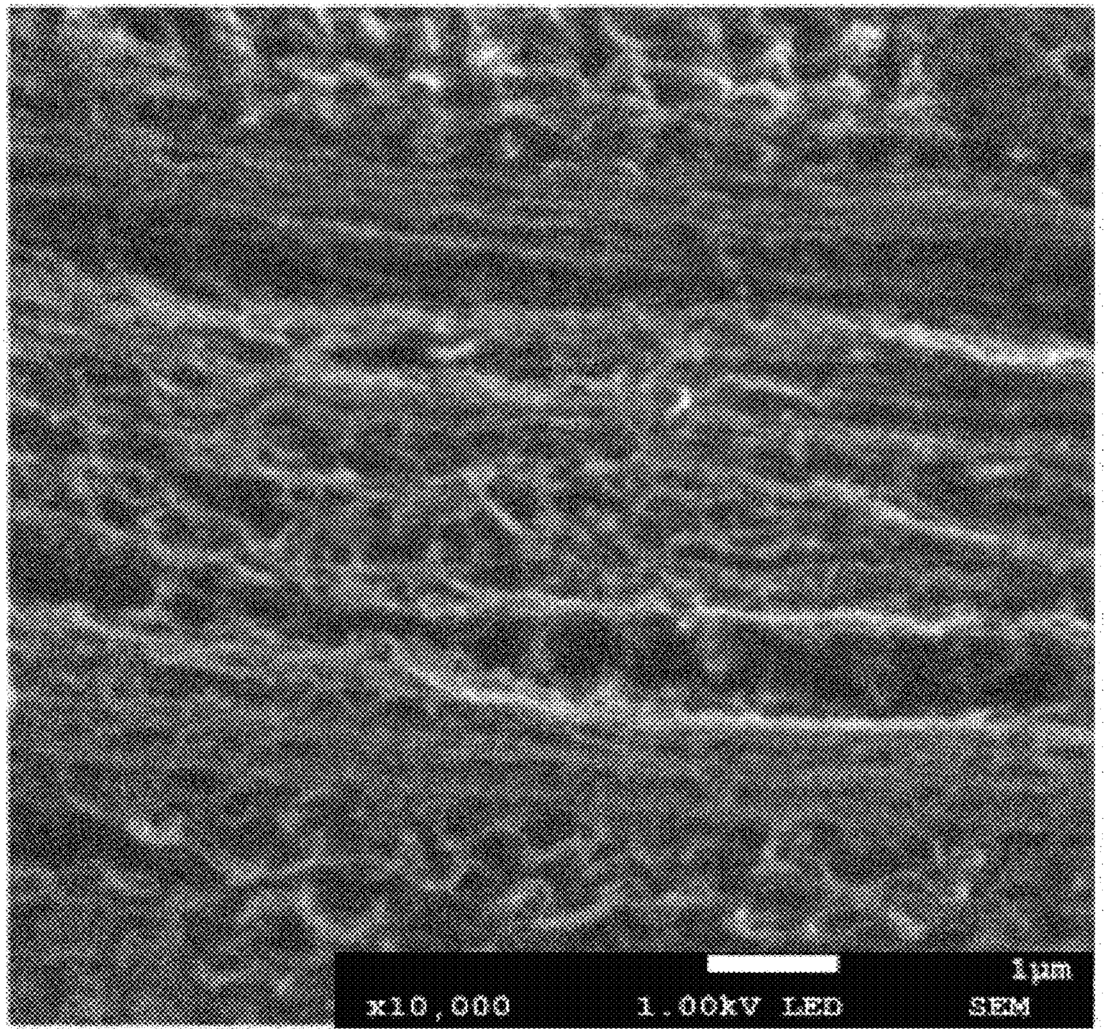
FIG. 1 is a scanning electron microscopic (SEM) image of a CNT assembly according to one example of the present disclosure.

The reason why the CNT assembly satisfying at least one of the above-described conditions (1) to (3) has an excellent dispersibility has not been clarified yet, but is hypothesized as follows. FIG. 1 is a scanning electron microscopic (SEM) image of one example of a CNT assembly satisfying at least one of (1) to (3) above. As depicted in FIG. 1, the CNTs composing the CNT assembly satisfying at least one of the above-described conditions (1) to (3) have wave-like structures. It is hypothesized that such "wave-like structures" help to reduce interactions among CNTs composing the CNT assembly. If interactions among CNTs are reduced, the CNTs included in the CNT assembly are prevented from tightly bundling and aggregating. As a result, the CNT assembly can be easily dispersed. Further, the high dispersibility of the CNT assembly may provide the effect of improving the secondary processibility of the CNT assembly. For example, when a CNT assembly is formed into a sheet in production of an electrode for a secondary battery, this effect may lead to an increased electrical capacity of the produced electrode for a secondary battery. Hereinafter, the above-described conditions (1) to (3) which can be satisfied by the CNT assembly of the present disclosure will be described in detail.

Condition (1)

The condition (1) specifies as follows: "a spectrum obtained by a Fourier transform infrared spectroscopic analysis on a carbon nanotube dispersion obtained by dispersing the carbon nanotube assembly such that the bundle length is 10 μm or more, has at least one peak based on plasmon resonance of the carbon nanotube dispersion in a wavenumber range of more than 300 $cm^{-1}$ and 2000 $cm^{-1}$ or less". Conventionally, a high absorptivity in the far infrared region is known as one of optical characteristics of CNTs. It is considered that this high absorptivity in the far infrared region is attributable to the diameters and lengths of the CNTs. The relationship between the absorptivity in the far-infrared region, more specifically, the plasmon resonance-based peak of CNTs, and the lengths of the CNTs is discussed in detail in non-patent literature (T. Morimoto et. al., "Length-Dependent Plasmon Resonance in Single-Walled Carbon Nanotubes," pp 9897-9904, Vol. 8, No. 10, ACS NANO, 2014). Based on the discussions described in the above non-patent literature and our own findings, the present inventors have built a hypothesis in that the position of a detected plasmon resonance-based peak of CNTs in a spectrum obtained by a Fourier transform infrared spectroscopic analysis may be somewhat affected by the distance between defect points in the CNTs, and have verified this hypothesis. The present inventors then have found that the position of a detected plasmon resonance-based peak of CNTs can serve as the index corresponding to the path between bending points in a CNT having a wave-like structure, and have established the above condition (1).

In the condition (1), if a plasmon resonance-based peak of CNTs is present in a wave number range of greater than 300 $cm^{-1}$ and 2000 $cm^{-1}$ or less, preferably in a wave number range of 500 $cm^{-1}$ or more and 2000 $cm^{-1}$ or less, more preferably in a wave number range of 700 $cm^{-1}$ or more and 2000 $cm^{-1}$ or less, the CNTs can have a good dispersibility.

Figure 2:
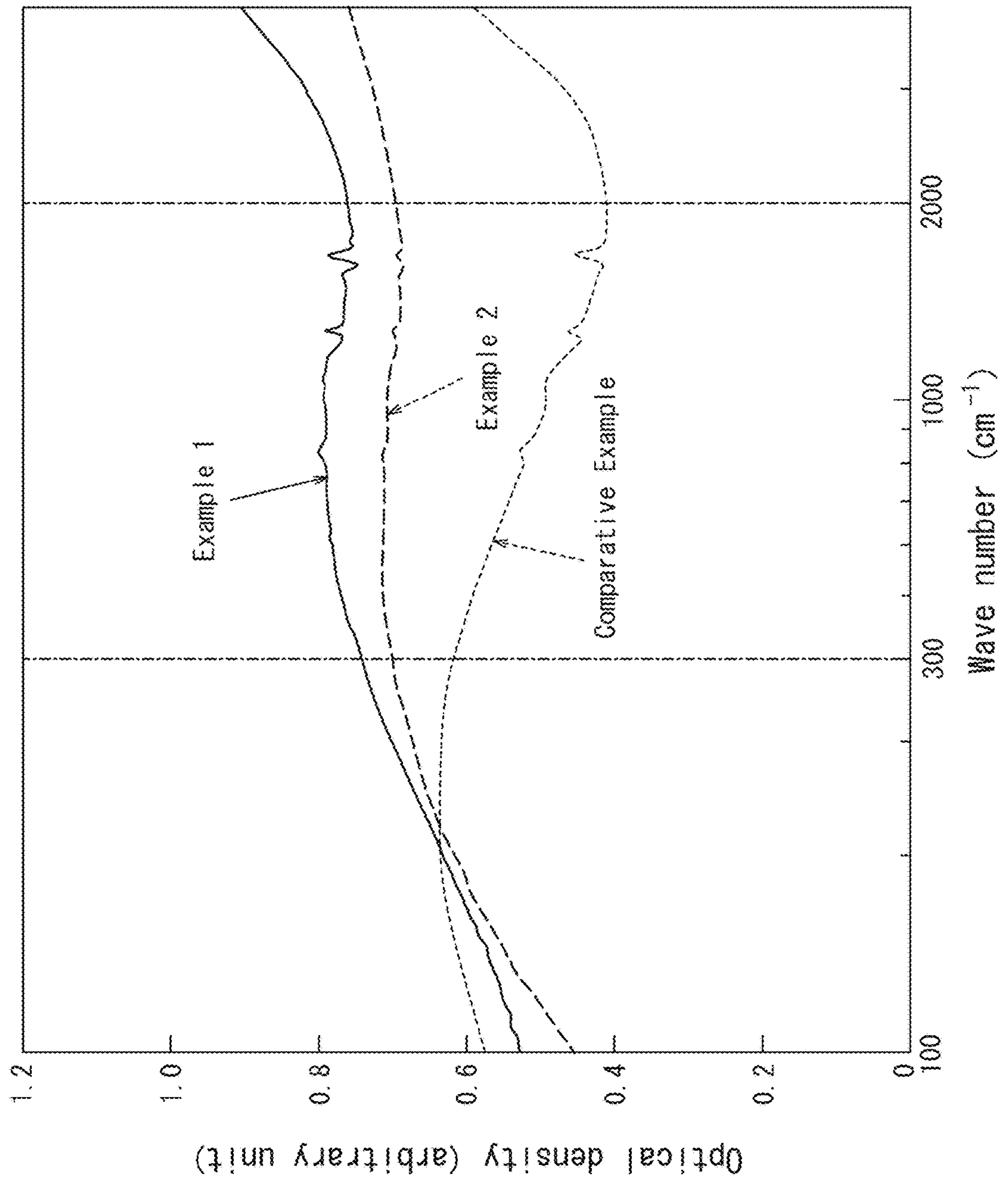
FIG. 2 is a spectrum obtained by a Fourier transform infrared spectroscopic analysis of the CNT assembly according to one example of the present disclosure.

As depicted in FIG. 2, in a spectrum obtained by a Fourier transform infrared spectroscopic analysis, sharp peaks are observed in the vicinity of the wave number of 840 $cm^{-1}$, in the vicinity of the wave number of 1300 $cm^{-1}$, and in the vicinity of the wave number of 1700 $cm^{-1}$, other than the relatively gentle plasmon resonance-based peak of the carbon nanotube dispersion. These sharp peaks are not "plasmon resonance-based peaks of carbon nanotube dispersion", and each correspond to infrared absorption derived from functional groups. More specifically, the sharp peak in the vicinity of the wave number of 840 $cm^{-1}$ is attributable to out-of-plane bending vibration of C—H; the sharp peak in the vicinity of the wave number of 1300 $cm^{-1}$ is attributable to expansion and contraction vibration of epoxy three-membered rings; and the sharp peak in the vicinity of the wave number of 1700 $cm^{-1}$ is attributable to expansion and contraction vibration of C═O. As mentioned in the above non-patent literature by T. Morimoto et al., in the wave number range of more than 2000 $cm^{-1}$, a peak similar to the S1 peak is detected other than plasmon resonance-based peaks. Accordingly, the present inventors have established 2000 $cm^{-1}$ or less as the upper limit for making a determination whether or not a plasmon resonance-based peak of the carbon nanotube dispersion is present in the condition (1).

Herein, in the condition (1), for obtaining a spectrum by a Fourier transform infrared spectroscopic analysis, a carbon nanotube dispersion needs to be obtained by dispersing the carbon nanotube assembly such that the bundle length is 10 μm or more. For example, a dispersion liquid where carbon nanotube dispersion having a bundle length of 10 μm or more is dispersed in water can be obtained by blending the carbon nanotube assembly, water, and a surfactant (e.g., sodium dodecylbenzenesulfonate) an appropriate ratio and agitating by means of ultrasonic waves or the like for a predetermined time duration.

The bundle length of the carbon nanotube dispersion can be determined by analyzing the dispersion with a particle size measurement apparatus in the wet image analysis type. Such a measurement apparatus calculates the area of each carbon nanotube dispersion from a captured image of the dispersion, and determines the diameter of a circle corresponding to the calculated area (hereinafter, sometimes also referred to as ISO area diameter). In this specification, the bundle length of each dispersion is defined as the value of the ISO area diameter obtained in this manner.

Condition (2)

The condition (2) specifies as follows: "the highest peak in a differential pore capacity distribution measured on the carbon nanotube assembly is located within a pore size range of more than 100 nm and less than 400 nm". The differential pore capacity distribution measured on the carbon nanotube assembly can be obtained from an adsorptive isotherm at 77 K of liquid nitrogen based on the Barrett-Joyner-Halenda (BJH) method. Note that the BJH method is a measurement method in which the pore size distribution is determined on the assumption that pores have cylindrical shapes. The peak in the differential pore capacity distribution measured on a carbon nanotube assembly in a range of over 100 nm means that CNTs in the carbon nanotube assembly are spaced apart from each other with certain spaces, so that the CNTs are not excessively densely aggregated. The upper limit of 400 nm is the measurement limit in the measurement apparatus (BELSORP-mini II) used in Examples.

From the viewpoint of further increasing the dispersibility, the value of the differential pore capacity distribution of the highest peak in the differential pore capacity distribution of the CNT assembly is preferably 2 $cm^3/g$ or more.

Condition (3)

The condition (2) specifies as follows: "a two-dimensional spatial frequency spectrum of an electron microscopic image of the carbon nanotube assembly has at least one peak within a range of 1 $μm^{-1}$ or more and 100 $μm^{-1}$ or less". A determination whether or not this condition is satisfied can be determined as follows. First, a CNT assembly to be analyzed is observed under an electron microscope (e.g., electrolytic radiation scanning electron microscope) at a magnification (e.g., 10000×), and a plurality of (e.g., 10) electron microscopic images in a field of view of 1 cm square are obtained. Each of the plurality of electron microscopic images obtained is analyzed by fast Fourier transform (FFT) to obtain a two-dimensional spatial frequency spectrum. Each of the obtained two-dimensional spatial frequency spectrum of the plurality of electron microscopic images is binarized, and the average of the peak positions of the highest frequency is calculated. If the average of the obtained peak positions is within the range of 1 $μm^{-1}$ or more 100 $μm^{-1}$ or less, it is determined that the condition (3) was satisfied. Here, "peaks" used in the above determination shall be distinct peaks which are identified by carrying out isolated point detection processing (in other words, a reverse operation of isolated point removal). Accordingly, if no distinct peak is identified within a range of 1 $μm^{-1}$ or more and 100 $μm^{-1}$ or less in isolated point detection processing, it is determined that the condition (3) is not satisfied Herein, from the viewpoint of further increasing the dispersibility, the peak of the two-dimensional spatial frequency spectrum is preferably in a range of 2.6 $μm^{-1}$ or more and a range of 100 $μm^{-1}$ or less.

From the viewpoint of further increasing the dispersibility, the carbon nanotube assembly of the present disclosure preferably satisfies at least two of the conditions (1) to (3), and more preferably satisfies all of the conditions (1) to (3).

<Properties of CNT Assembly>

The CNT assembly of the present disclosure preferably has the following properties, for example.

The CNT assembly of the present disclosure has a total specific surface area according to the BET method of preferably 600 $m^2/g$ or more, more preferably 800 $m^2/g$ or more, and preferably 2,600 $m^2/g$ or less, more preferably 1,400 $m^2/g$ or less. Further, the CNT assembly which has undergone opening formation treatment preferably has a total specific surface area according to the BET method of 1,300 $m^2/g$ or more. In a CNT assembly having a high specific surface area, the CNTs composing the assembly are spaced apart from each other, so that the CNTs are not excessively bundled. Accordingly, the CNTs are loosely coupled to each other, so that the CNTs can be easily dispersed. The CNT assembly may include single-walled CNTs as the main component, and may also include two-walled CNTs and multi-walled CNTs to the extent that the functionalities are not impaired. The total specific surface area of CNTs according to the BET method can be measured using, for example, a BET specific surface area measurement apparatus according to JIS Z 8830.

The CNTs composing the CNT assembly has an average height of preferably 10 μm or more and 10 cm or less, more preferably 100 μm or more and 2 cm or less. When the average height of the CNTs composing the CNT assembly is 10 μm or more, aggregation with adjacent CNT bundles is prevented, so that the CNTs can be easily dispersed. When the average height of the CNTs composing the CNT assembly is 100 μm or more, a network of the CNTs can be more easily formed, so that the CNTs can be suitably used in applications in which higher conductivity or mechanical strength are required, such as in production of electrodes. Further, when the average height of the CNTs composing the CNT assembly is 10 cm or less, rapid generation can be achieved, which reduces adhesion of carbonaceous impurities and improves the specific surface area. Furthermore, when the average height of the CNTs composing the CNT assembly is 2 cm or less, the CNTs become more easily dispersed. The average height of the CNTs can be determined by measuring the lengths of 100 randomly-selected CNTs under observation by scanning electron microscopy (SEM).

The CNT assembly preferably has a tap bulk density of 0.001 g/cm$^3$ or more and 0.2 g/cm$^3$ or less. Because adhesion between CNTs in a CNT assembly having a density in this range is not excessively strong, the CNT assembly has an excellent dispersibility and can be molded into various shapes. When the tap bulk density of the CNT assembly is 0.2 g/cm$^3$ or less, the CNT assembly can be dispersed homogenously in a solvent or the like by agitating because adhesion between CNTs composing the CNT assembly is weaker. Moreover, when the tap bulk density is 0.001 g/cm$^3$ or more, the unity of the CNT assembly improves, making handle of the CNT assembly easier. The tap bulk density is an apparent bulk density when a powdery CNT assembly is filled in a container, and powdery particles are tightly packed with reduced spaces by tapping or vibrating the container or otherwise, so that the powder particles.

Further, the CNTs composing the CNT assembly has an average outer diameter of preferably 0.5 nm or more, more preferably 1.0 nm or more, and preferably 15.0 nm or less, more preferably 10.0 nm or less, and even more preferably 5.0 nm or less. When the average outer diameter the CNTs is 1.0 nm or more, bundling of the CNTs is reduced and a high specific surface area can be maintained. When the average outer diameter the CNTs is 5.0 nm or less, the ratio of multi-walled CNTs is smaller and a high specific surface area can be maintained. The average outer diameter of the CNTs is determined by measuring the diameters (outer diameters) of 100 randomly-selected CNTs under observation by transmission electron microscopy (TEM). The average diameter (Av) and the standard deviation (δ) of the CNTs may be adjusted by changing the production method and the production conditions of the CNTs, or may be adjusted by combining a plurality of types of CNTs obtained by different production methods.

The CNT assembly preferably has a G/D ratio of 1 or more and 50 or less. When the G/D ratio of the CNT assembly is less than 1, it is considered that the crystallinity of single-walled CNTs is low, the amount of contaminants such as amorphous carbon is high, and the content of multi-walled CNTs is high. On the other hand, when the G/D ratio of the CNT assembly is greater than 50, the linearity is increased, the CNTs become more likely to form bundles with smaller spaces, and specific surface areas may be reduced. The G/D ratio is an index commonly used to evaluate the quality of CNTs. In a Raman spectrum of CNTs as measured by a Raman spectrometer, vibration modes referred to as the "G band" (near 1,600 cm$^{-1}$) and "D band" (near 1,350 cm$^{-1}$) are observed. The G band corresponds to vibration modes caused by a hexagonal lattice structure of graphite forming cylindrical surfaces of the CNTs and the D band corresponds to vibration modes caused by amorphous locations. Therefore, as the peak intensity ratio of the G band to the D band (G/D ratio) increases, the CNTs are evaluated to have higher crystallinity (linearity).

The purity of the CNT assembly is preferably as high as possible for achieving a high specific surface area. As used herein, the purity is the carbon purity, and is a value indicating how much percent of the mass of the CNT assembly is composed of carbon. Although there is no upper limit on the purity for achieving a high specific surface area, it is difficult to obtain a CNT assembly of 99.9999 mass % or more for manufacturing reasons. If the purity is less than 95 mass %, a specific surface area of more than 1000 m$^2$/g is difficult to be achieved without the opening formation treatment. Further, if metal impurities are contained and the carbon purity is less than 95 mass %, the metal impurities react with oxygen in the opening formation treatment to thereby hinder opening of the CNTs, making increase in the specific surface area difficult. From these viewpoints, the purity of the single-walled CNTs is preferably 95 mass % or more.

The CNT assembly normally has a purity without purification treatment of 98 mass % or more, preferably 99 mass % or more, and more preferably 99.9 mass % or more. The CNT assembly of the present disclosure hardly has any impurities mixed therein and can sufficiently exhibit the various inherent properties of CNTs. The carbon purity of the CNT assembly can be determined by an elemental analysis using X-ray fluorescence, thermogravimetric analysis (TGA), or other techniques.

(Production Method of Carbon Nanotube Assembly)

A production method of the carbon nanotube assembly of the present disclosure satisfies all of the following conditions (a) to (c) during growth of the carbon nanotube assembly.

(a) the growth rate of the carbon nanotube assembly is 5 μm/min or more;

(b) the concentration of a catalyst activating material in the growth atmosphere of the carbon nanotube assembly is 4 volume % or more; and (c) during growth of the carbon nanotube assembly, an obstacle is present in the growth direction of the carbon nanotubes which are to compose the carbon nanotube assembly.

The production method of the present disclosure enables efficient production of the above-described CNT assembly of the present disclosure. The production method of the present disclosure is not particularly limited as long as the above-described conditions (a) to (c) are satisfied during growth of the CNT assembly, and a CNT synthesis processes according to any of well-known techniques such as the fluidized bed method, the moving bed method, and the fixed bed method can be employed. As used herein, the fluidized bed method refers to a synthesis method in which CNTs are synthesized while a particulate carrier on which a catalyst for synthesizing CNTs is supported (hereinafter, also referred to as a particulate catalyst carrier) is fluidized. Further, the moving bed method and the fixed bed method refer to synthesis methods for synthesizing CNT without fluidizing a carrier on which a catalyst is supported (particulate carrier or plate-like carrier).

In one example, the production method of the present disclosure includes a catalyst carrier formation step of forming a catalyst carrier, a CNT synthesis step of synthesizing CNT using the catalyst carrier obtained in the catalyst carrier formation step, and a recovery step of recovering the CNTs synthesized in the CNT synthesis step. The catalyst carrier formation step can be carried out according to a well-known wet or dry catalyst supporting method. The recovery step can be carried out using a well-known separation and recovery apparatus such as a classifier.

<CNT Synthesis Step>

The CNT synthesis step is carried out such that all of the above-described conditions (a) to (c) are satisfied during growth of CNTs. Specifically, the condition (a) that "the growth rate of the carbon nanotube assembly is 5 μm/min or more" can be satisfied by appropriately adjusting the concentration, the temperature, and the like of a source gas serving as the carbon source in the CNT growth atmosphere. Herein, the source gas serving as the carbon source is not particularly limited, and gases of hydrocarbons such as methane, ethane, ethylene, propane, butane, pentane, hexane, heptane, propylene, and acetylene; gases of lower alcohols such as methanol and ethanol; and mixtures of these can also be used. Furthermore, the source gas may be diluted with an inert gas. Moreover, from the viewpoint of further increasing the dispersibility of the CNT assembly obtained, the growth rate of the CNT assembly is preferably 10 μm/minute or more. The temperature can be adjusted, for example, within a range of 400° C. or higher 1100° C. or lower.

In the CNT growth atmosphere, the source gas serving as the carbon source preferably contains ethylene. Heating ethylene within a certain temperature range (700° C. or higher and 900° C. or lower) can promote a decomposition reaction of ethylene, which leads to fast growth of CNTs when the decomposed gas is brought into contact with the catalyst. However, if the thermal decomposition time is too long, the decomposition reaction of ethylene proceeds excessively, causing deactivation of the catalyst and adhesion of carbon impurities onto the CNT assembly. In production of the CNT assembly of the present disclosure, in an ethylene concentration range of 0.1 volume % or more and 40 volume % or less, the thermal decomposition time ranges preferably 0.5 seconds or longer and 10 seconds or shorter. If the thermal decomposition time is shorter than 0.5 seconds, thermal decomposition of ethylene is insufficient, which makes fast growth of a CNT assembly having a large specific surface area difficult. If the thermal decomposition time is longer than 10 seconds, ethylene is decomposed excessively and carbon impurities are generated in a large amount, which causes deactivation of the catalyst and lowered quality of the CNT assembly. The thermal decomposition time is calculated from the following equation:

$$\text{(Thermal decomposition time)} = \text{(volume of heating channel)}/\{\text{(flow rate of source gas)} \times (273.15 + T)/273.15\}$$

where the volume of the heating channel is the volume of a flow path heated to a predetermined temperature T° C., through which the source gas is made to flow before the source gas is brought into contact with the catalyst, and the source gas flow rate is a flow rate at 0° C. under 1 atm.

Further, the condition (b) that "the concentration of a catalyst activating material in the growth atmosphere of the carbon nanotube assembly is 4 volume % or more" can be satisfied by appropriately adjusting the feeding rate of the catalyst activating material fed during the CNT growth. From the viewpoint of further increasing the dispersibility of the CNT assembly obtained, the concentration of a catalyst activating material in the growth atmosphere of the CNT assembly is preferably 5 volume % or more. Note that the concentration of a catalyst activating material in the growth atmosphere of the CNT assembly is typically 40 volume % or less. The catalyst activating material is not particularly limited, and examples thereof include water, oxygen, ozone, acidic gases, and nitrogen oxide; oxygen-containing compounds having a low carbon number, such as carbon monoxide and carbon dioxide; alcohols such as ethanol and methanol; ethers such as tetrahydrofuran; ketones such as acetone; aldehydes; esters; and mixtures thereof. Of these, carbon dioxide is preferred. Note that a material containing both carbon and oxygen, such as carbon monoxide and alcohols, may serve as both a source gas and a catalyst activating material. For example, carbon monoxide severs as a catalyst activating material when combined with a more reactive source gas such as ethylene, and severs as a source gas when combined with a catalyst activating material which has a stronger catalyst activating action even in a trace amount such as water.

Furthermore, the condition (c) that "during synthesis of the carbon nanotube assembly, an obstacle is present in the growth direction of the carbon nanotubes which are to compose the carbon nanotube assembly" can be satisfied by selecting the fluidized bed method in the CNT synthesis step or adjusting the interval to dispose the catalyst carrier in the moving bed method or the fixed bed method.

The catalyst carrier has a carrier and a catalyst supported on the surface of the carrier. The carrier is the portion forming a matrix structure such that the catalyst is adhered to, fixed to, formed as a film on, or formed on the surface of the carrier for supporting the catalyst. The carrier may be structured only from the carrier, or a carrier may be provided with an optional under layer for satisfactorily supporting the catalyst on the surface of the carrier. The carrier is preferably particulate, and the particle size thereof in terms of volume average particle size is preferably 1 mm or less, more preferably 0.7 mm or less, and even more preferably 0.4 mm or less, and is preferably 0.05 mm or more. When the particle size is smaller than or equal to the any of above upper limits, the CNT bundle to be grown becomes thinner, which is advantageous to form a wave-like structure. The particle density in terms of apparent volume is preferably 3.8 $g/cm^3$ or more, more preferably 5.8 $g/cm^3$ or more, and is preferably 8 $g/cm^3$ or less. When the particle density is equal to or higher than any of the above lower limits, the force applied to the CNT bundle during growth is increased, which is advantageous to form a wave-like structure. The material of the carrier is preferably a metal oxide containing one or more elements of Al and Zr. Of these, zirconia beads containing Zr with a high elemental amount are particularly preferred.

In the CNT synthesis step, before the "growth step" is carried out so that the above-described conditions (a) to (c) are satisfied, a "formation step" of reducing the catalyst supported on the catalyst carrier may be carried out. Moreover, after the growth step is terminated, a "cooling step" of cooling the catalyst carrier on which the CNT has grown may be carried out. In the "formation step", for example, at least one of a reducing gas atmosphere which is an atmosphere including the catalyst carrier or the catalyst carrier is heated to reduce and microparticulate the catalyst supported on a catalyst carrier. The temperature of the catalyst carrier or the reducing gas atmosphere in the formation step is preferably 400° C. or higher and 1100° C. or lower. The time to carry out the formation step may be 3 minutes or longer and 120 minutes or shorter. Note that the reducing gas may, for example, be hydrogen gas, ammonia gas, water vapor, or a gas that is a mixture thereof. Furthermore, the reducing gas may be a mixed gas obtained by mixing these gases with an inert gas such as helium gas, argon gas, or nitrogen gas.

On the other hand, in the "cooling step", the catalyst carrier on which the CNTs have grown is cooled in an inert gas environment. In this step, an inert gas similar to the inert gas which can be used in the growth step may be used as the inert gas. Further, in the cooling step, the temperature of the catalyst carrier on which the CNT has grown is lowered to a temperature of preferably 400° C. or lower, more preferably 200° C. or lower.

EXAMPLES

The following provides more specific description of the present disclosure with reference to examples. However, the present disclosure is not limited to these examples.

In Examples and Comparative Example, measurements and evaluations were carried out as follows.

(Fourier Transform Infrared Spectroscopic Analysis (FT-IR))

To 10 mg of each CNT assembly prepared in Examples and Comparative Example, 100 g of water containing sodium dodecylbenzenesulfonate as a surfactant at a concentration of 1 mass % was added. The resultant was agitated in an ultrasonic bath at 45 Hz for 1 minute to obtain 100 ml of a dispersion liquid of the CNT assembly.

Each dispersion liquid prepared as described above was two-fold diluted with a solvent having the same composition, which was dropped onto a silicon substrate and dried. Thereafter, a measurement of the effective plasmon length was carried out based on a plasmon far-infrared (FIR) resonance peak using a Fourier transform infrared spectrophotometer. The effective plasmon lengths are summarized in Table 1. The FIR resonance chart of the obtained FIR spectra is depicted in FIG. 2. The curves plotted in FIG. 2 are those of Examples 1 to 2 and Comparative Example in this order from the top. As indicated in the chart, the curves corresponding to Examples 1 to 2 had optical density peaks at 300 $cm^{-1}$ or more. On the other hand, the optical density peak in the curve corresponding to Comparative Example was located at 214 $cm^{-1}$. Note that the position of each plasmon peak top was determined based on the approximation curve by polynomial fitting using drawing software.

(Measurement of Bundle Length of CNTs)

Using each dispersion liquid prepared for the FT-IR measurements, the average ISO area diameter of CNT dispersions present in the dispersion liquid was measured using a circulation-type image analysis particle size distribution meter "CF-3000", manufactured by JASCO International Co., Ltd.), and the obtained value was used as the CNT bundle length. The conditions for the analysis were as follows.

<Conditions for Analysis>

Injection volume: 50 ml (sampling volume: 1.2%)

Flow cell spacer: 1000 μm

Front lens magnification: 2×

Telecentric lens magnification: 0.75×

Length per pixel: 2.3 μm per pixel

While each dispersion liquid was circulated, measurements were made 4 times under the same conditions, and the arithmetic mean value of measured values was obtained.

(Measurement of Differential Pore Capacity Distribution)

Figure 3:
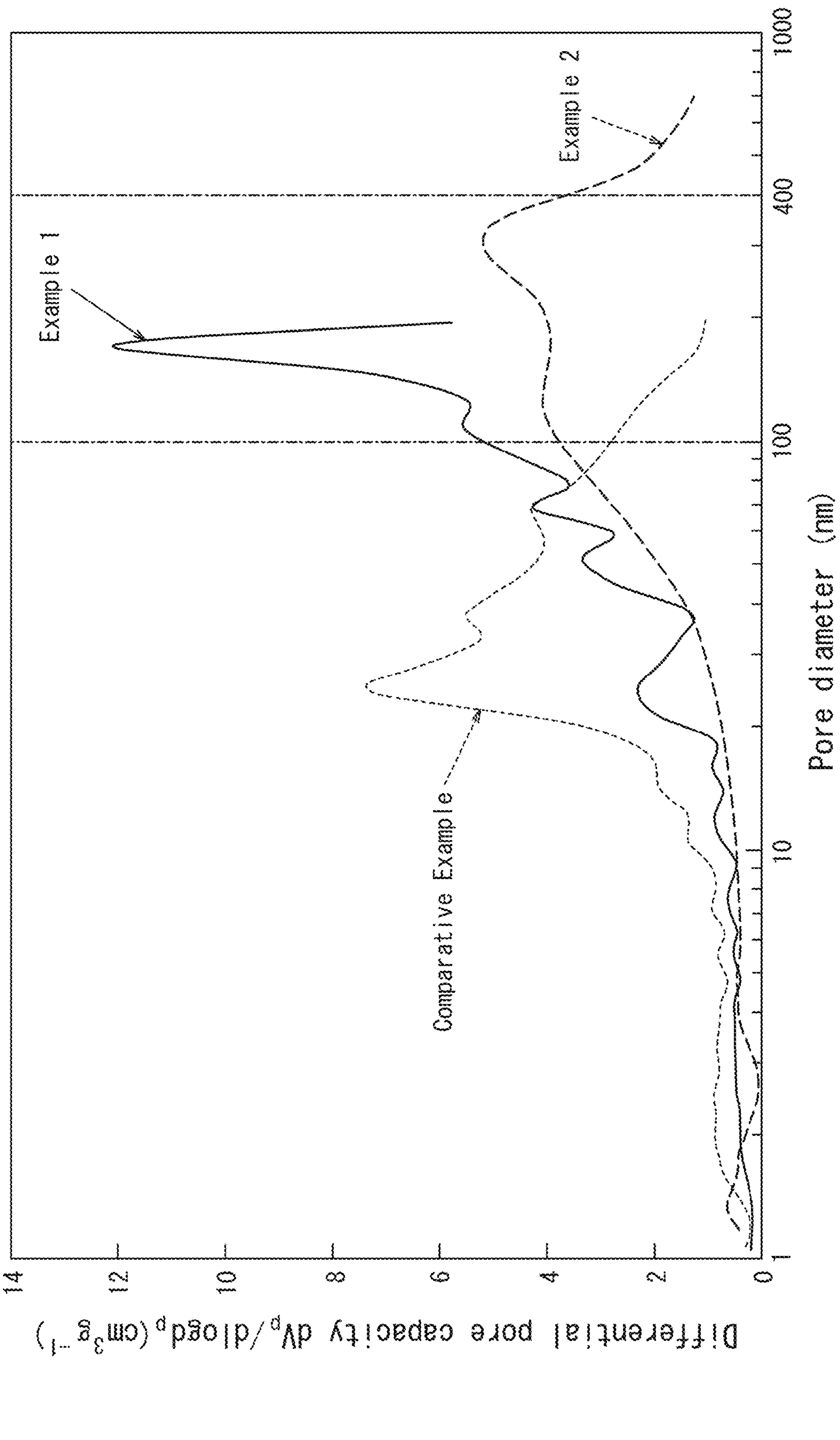
FIG. 3 illustrates differential pore capacity distributions determined by the BJH method of samples according to Examples 1 to 3.

Using 10 mg or more of each CNT assembly of Examples 1 and 2 and Comparative Example, the adsorption and desorption isotherm was obtained using liquid nitrogen at 77 K using BELSORP-mini II (manufactured by MicrotracBEL Corp.) (the adsorption equilibration time was set to 500 seconds). The CNT assembly was pretreated by degassing under vacuum at 100° C. for 12 hours. The differential pore capacity distribution of each sample was obtained from the adsorption amount on the adsorption isotherm by the BJH method. The results are depicted in FIG. 3. As depicted in FIG. 3, the highest peaks of the differential pore capacity were identified in pore size regions of 100 nm or more in Examples 1 and 2. In contrast, the highest peak was identified in a pore size region of 100 nm or less in Comparative Example 1.

(Two-Dimensional Spatial Frequency Spectrum Analysis of Electron Microscopic Image)

Figure 4A:
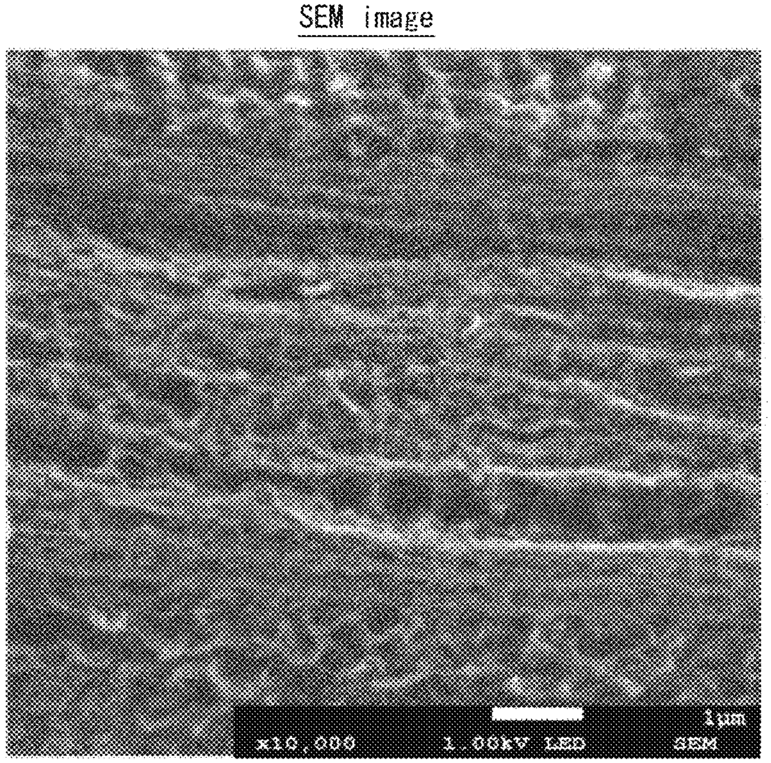
FIG. 4A is one of 10 electron microscopic images obtained in Example 1.
Figure 4B:
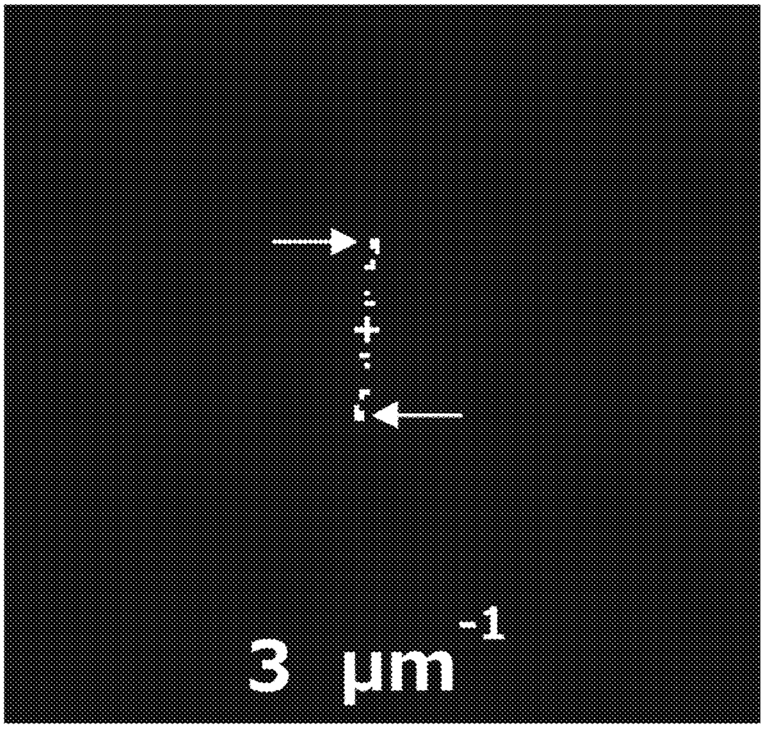
FIG. 4B is a two-dimensional frequency spectrum obtained for the electron microscopic image depicted in FIG. 4A.
Figure 5A:
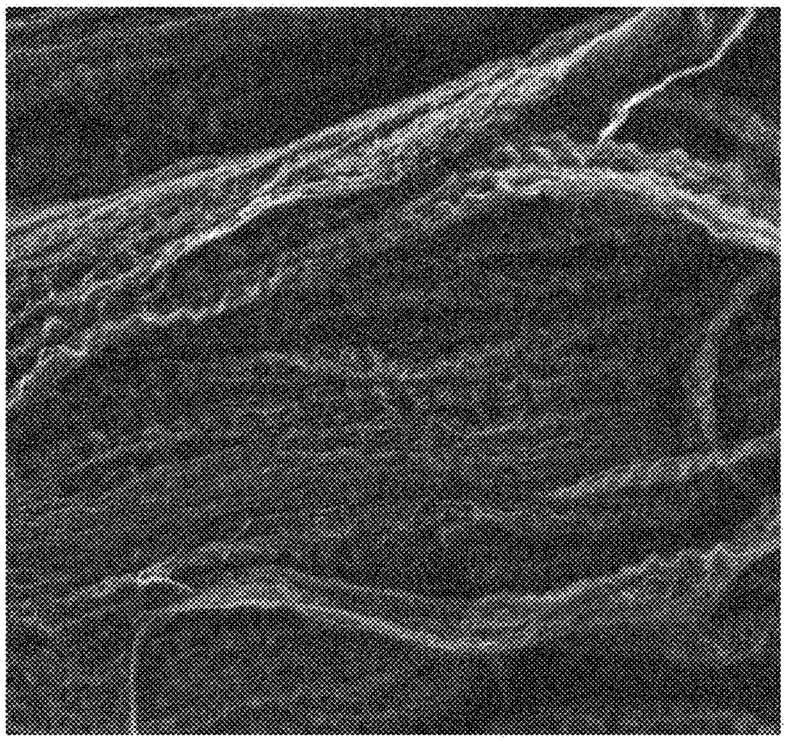
FIG. 5A is one of 10 electron microscopic images obtained in Example 2.
Figure 5B:
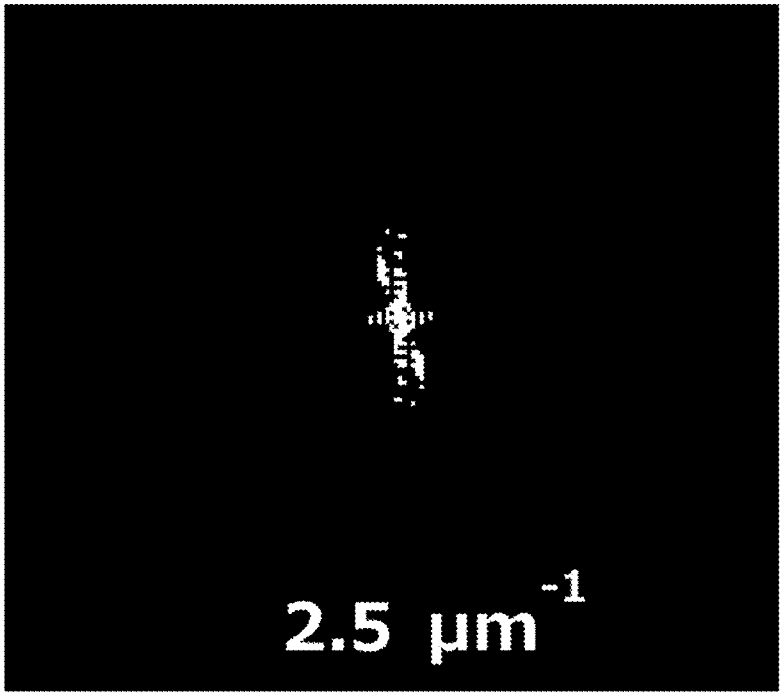
FIG. 5B is a two-dimensional frequency spectrum obtained for the electron microscopic image depicted in FIG. 5A.
Figure 6A:
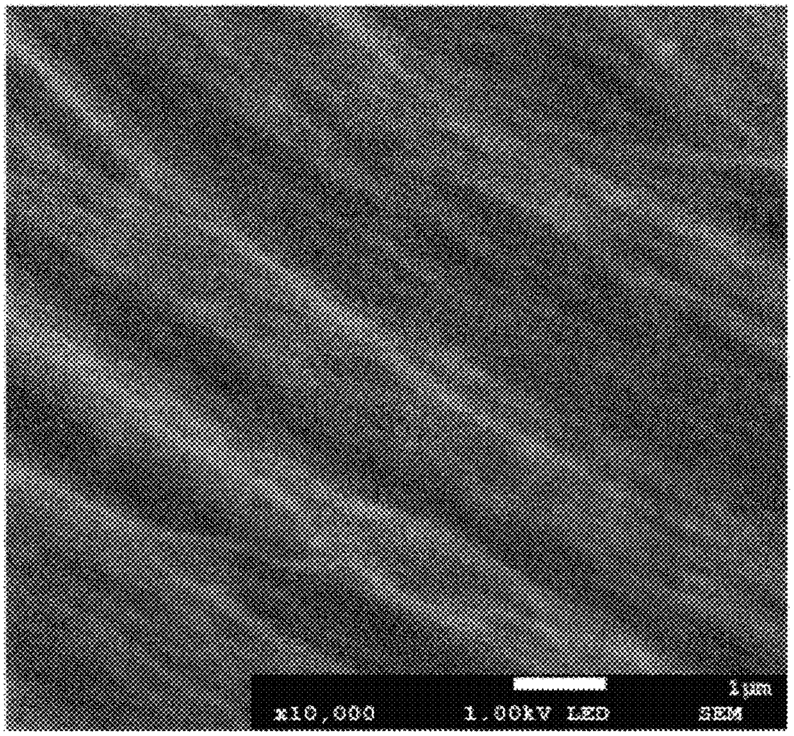
FIG. 6A is one of electron microscopic images obtained in Comparative Example.
Figure 6B:
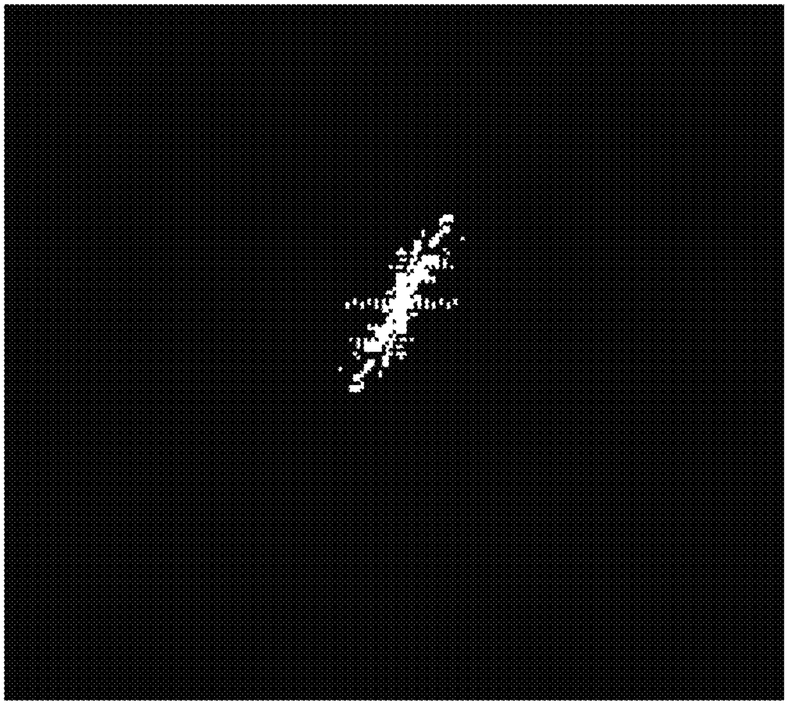
FIG. 6B is a two-dimensional frequency spectrum obtained for the electron microscopic image depicted in FIG. 6A.

On a carbon tape, 0.01 mg of each CNT assembly of Examples and Comparative Example was placed, and excess CNTs were removed by blowing to prepare a sample. The sample was observed at 10,000× under a field emission scanning electron microscope, and 10 photographs were taken in a field of view of 1 cm square, which was arbitrarily selected. Fast Fourier transform processing was carried out on each of the 10 electron microscopic images to obtain a two-dimensional spatial frequency spectrum. The obtained two-dimensional spatial frequency spectra were binarized, and the outermost peak positions (on the high frequency side) were identified and the average was calculated. In the binarization, when the numerical value obtained through the fast Fourier transform processing was greater than 0.75, 1 was given, or 0 was given otherwise. FIG. 4A is one of the 10 images obtained in Example 1, and FIG. 4B is a two-dimensional spatial frequency spectrum obtained from this image. In FIG. 4B, the components closer to the center are low-frequency components, and the components located outward from the center correspond to higher-frequency components. In the diagram, the arrows indicate the peak positions (3 $\mu m^{-1}$) with the greatest wave number among the distinct peaks detected in the region of 1 to 100 $\mu m^{-1}$. FIG. 5A is one of electron microscopic images obtained in Example 2, and FIG. 5B is a two-dimensional spatial frequency spectrum obtained from this image. Again, as a result of the analysis on FIG. 5B, the peak position with the greatest wave number among the distinct peaks detected in the range of 1 to 100 $\mu m^{-1}$ was confirmed to be 2.5 $\mu m^{-1}$. Further, FIG. 6A is one of electron microscopic images obtained in Comparative Example, and FIG. 6B is a two-dimensional spatial frequency spectrum obtained from this image. In an attempt to detect a distinct peak, isolated point extracting processing was carried out on all the images obtained in Comparative Example including the data depicted in FIGS. 6A and 6B, but no distinct peak was identified in the region of 1 to 100 $\mu m^{-1}$ Thus, the CNT assembly according to Comparative Example was confirmed not to satisfy the above-described condition (3).

(Dispersibility of CNT Assembly)

Figure 7:
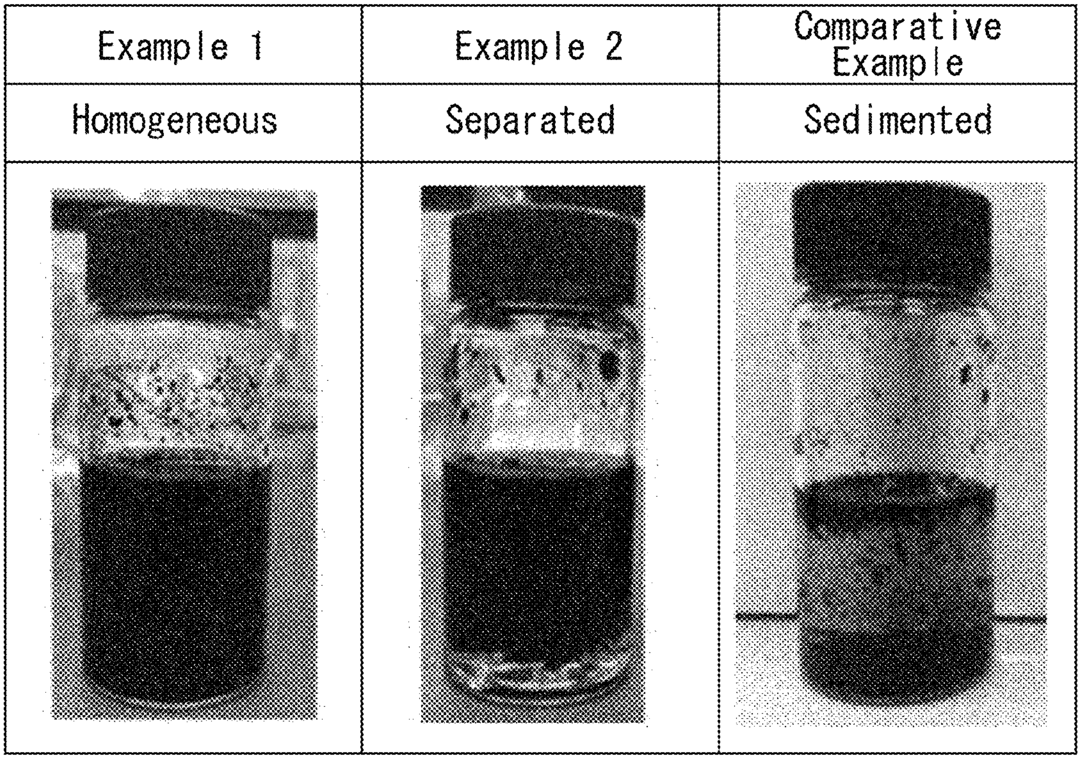
FIG. 7 illustrates the results of evaluations of the dispersibility of the CNT assemblies obtained in Examples and Comparative Example.

The CNT assemblies obtained in Examples and Comparative Example were charged into respective vials in an amount of 5 mg, and 25 mL of water was each added and the vials were shaken 20 times for dispersing the CNT assemblies. After each dispersion liquid was allowed to stand for 1 hour, the appearance was observed. Sedimentation was observed in the CNT assembly of Comparative Example, whereas no sedimentation was observed in both of the CNT assemblies of Examples. The results are depicted in FIG. 7. It is to be noted that, as is apparent from FIG. 7, a homogeneous dispersion without separation or sedimentation was achieved in Example 1. In Example 2, however, although no sedimentation was observed, separation occurred. The dispersibility of each CNT assembly was evaluated according to the following criteria:

A: homogeneous dispersion was observed after being allowed to stand for 1 hour;

B: sedimentation was not observed after being allowed to stand for 1 hour; and

C: sedimentation was observed after being allowed to stand for 1 hour.

Example 1

Figure 8:
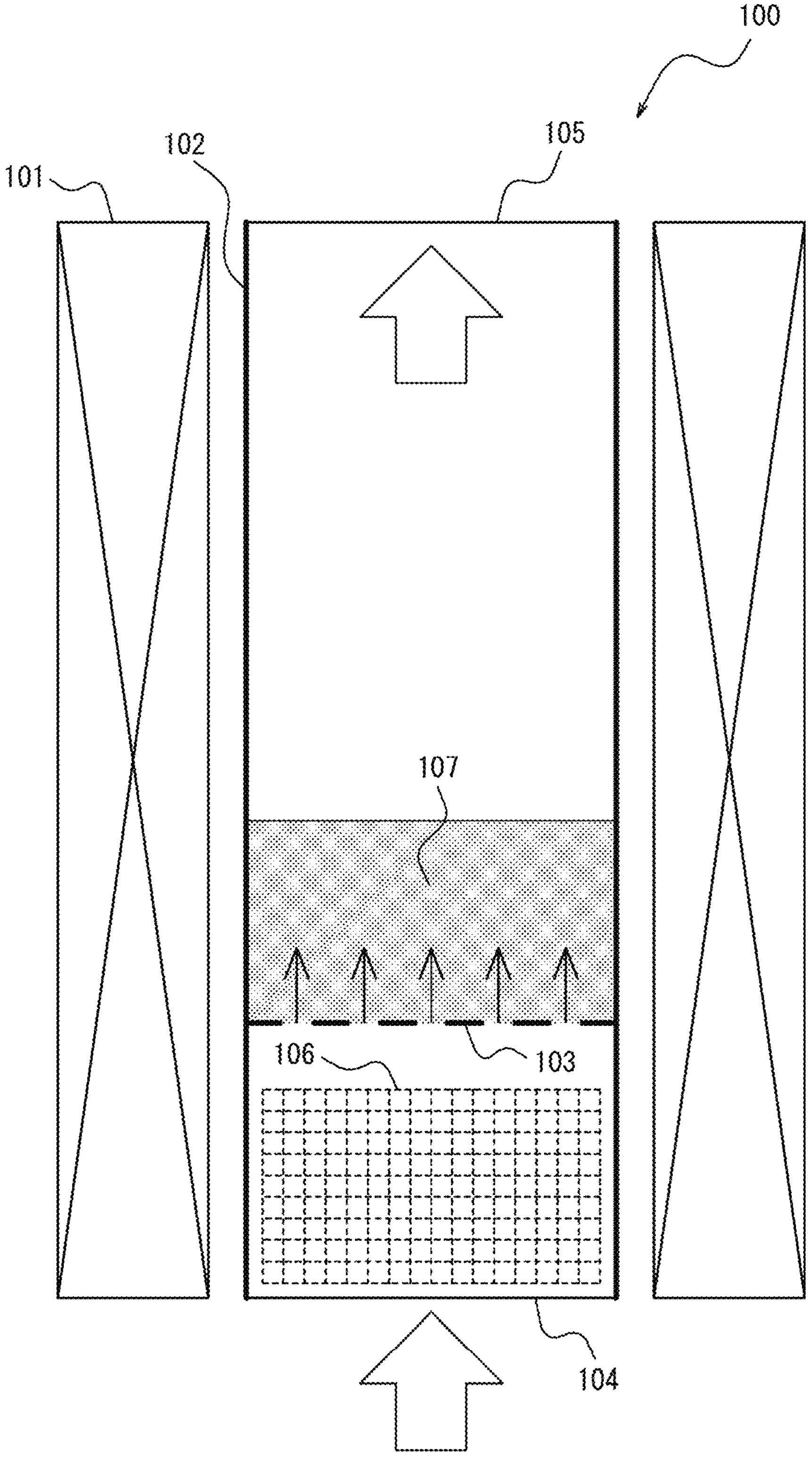
FIG. 8 is a diagram illustrating a schematic configuration of a CNT manufacturing apparatus used in Example 1.

In this example, CNTs were synthesized using the fluidized bed method in the CNT synthesis step. The schematic configuration of a CNT manufacturing apparatus used is depicted in FIG. 8. The CNT manufacturing apparatus 100 depicted in FIG. 8 includes a heater 101, a reaction tube 102, a dispersion plate 103, a reducing gas/source gas inlet 104, an exhaust vent 105, and a gas heating promoting unit 106. The material of the reaction tube 102 and the dispersion plate 103 was synthetic quartz.

<Catalyst Carrier Formation Step>

A catalyst carrier formation step will be described below. Zirconia (zirconium dioxide) beads ($ZrO_2$, volume average particle size D50: 350 μm, particle density: 6 g/cm$^3$) as a carrier were charged into a rotary drum type coating apparatus. While the zirconia beads were agitated (at 20 rpm), a solution containing aluminum was sprayed (spray amount: 3 g/min, spray time: 940 seconds, spray air pressure: 10 MPa) by a spray gun. At the same time, compressed air (300 L/minute) was fed to the rotary drum for drying to form an aluminum-containing film on the zirconia beads. Next, a firing treatment was performed at 480° C. for 45 minutes to prepare primary catalyst particles having an aluminum oxide layer formed thereon. Thereafter, the resultant primary catalyst particles were charged into another rotary drum type coating apparatus. While agitating (at 20 rpm), compressed air (300 L/minute) was fed into the rotary drum. An iron catalyst solution was sprayed with a spray gun (spray amount: 2 g/min, spray time: 480 seconds, spray air pressure: 5 MPa) to form a coating film containing iron on the primary catalyst particles. Next, a firing treatment was performed at 220° C. for 20 minutes to prepare a catalyst carrier having an iron oxide layer further formed thereon.

<Synthesis of CNT>

The reaction tube 102 of the CNT manufacturing apparatus 100 was charged with 300 g of the thus-prepared catalyst carrier. While the catalyst carrier 107 was fluidized by flowing the gases, the formation step, the growth step, and the cooling step were carried out in this order to thereby produce a CNT assembly.

The conditions for each step included in the CNT synthesis process were set as follows.

Formation Step

Setting temperature: 800° C.

Reducing gases: 3 sLm of nitrogen and 22 sLm of hydrogen

Process time: 25 minutes

Growth Step

Setting temperature: 800° C.

Source gases: 15 sLm of nitrogen, 5 sLm of ethylene, 2 sLm of carbon dioxide, and 3 sLm of hydrogen Process time: 10 minutes Thermal decomposition time of source gases: 0.65 seconds Cooling Step Cooling temperature: room temperature Purge gas: 25 sLm of nitrogen The CNT assembly synthesized on the catalyst carrier was separated and recovered using a forced vortex classifier (revolution speed: 3500 rpm, air flow rate: 3.5 Nm$^3$/minute). The recovery rate of the CNT assembly was 99%.

The properties of the CNT assembly produced in this example were as follows: tap bulk density: 0.01 g/cm$^3$, average height of CNTs: 200 μm, BET specific surface area: 800 m$^2$/g, average outer diameter: 4.0 nm, and carbon purity: 99%. Each measurement and evaluation were performed as described above. The results are summarized in Table 1.

Example 2

Figure 9:
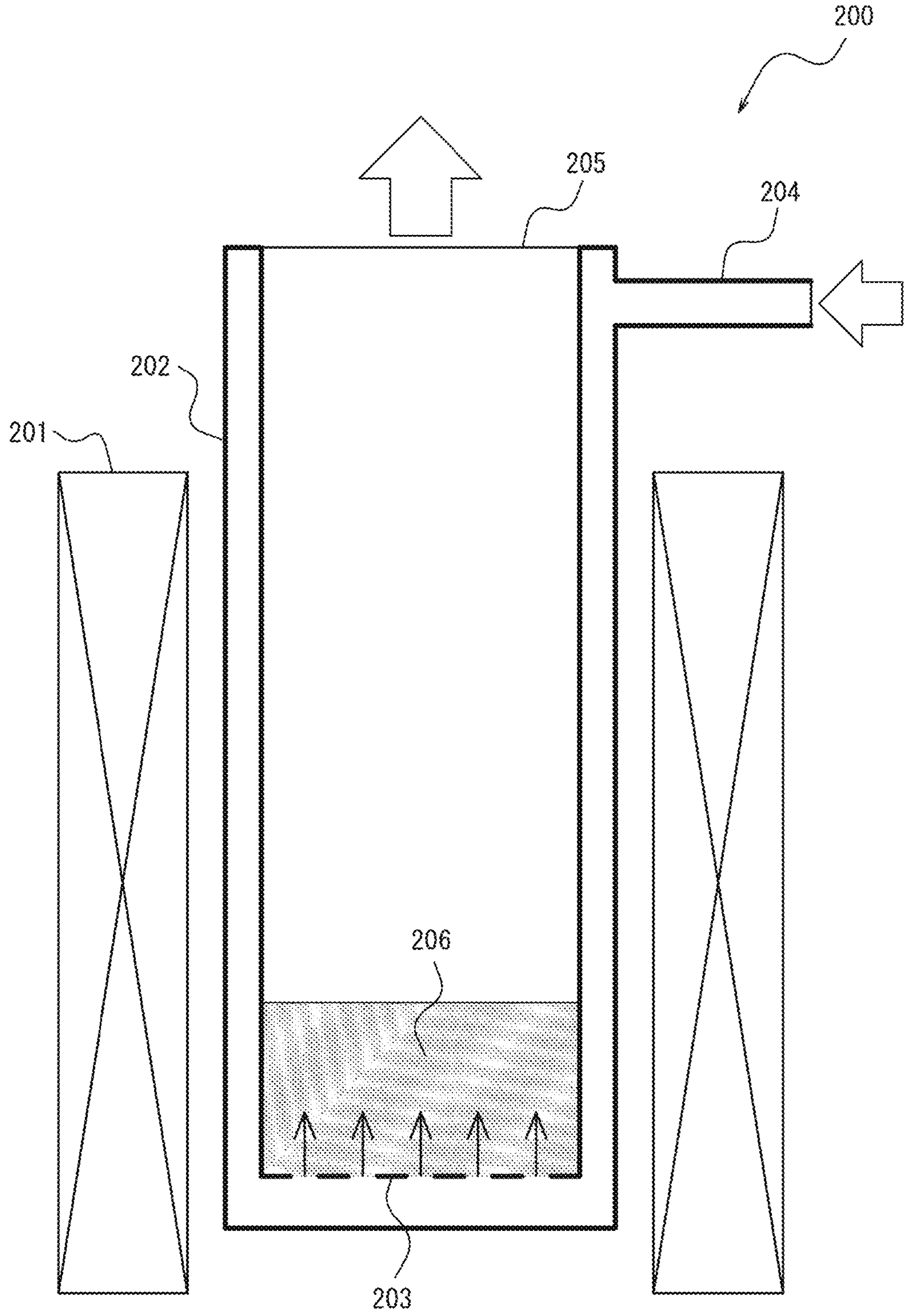
FIG. 9 is a diagram illustrating a schematic configuration of a CNT manufacturing apparatus used in Example 2.

In this example, the fluidized bed method was carried out in the CNT synthesis step using an apparatus different from that in Example 1 to synthesize CNTs. The schematic configuration of the CNT manufacturing apparatus 200 used is depicted in FIG. 9. The CNT manufacturing apparatus 200 includes a heater 201, a reaction tube 202, a dispersion plate 203, a reducing gas/source gas inlet 204, and an exhaust vent 205. The reaction tube 202 is a double tube having a double tube structure in which the reducing gas and the source gas are circulated between the outer tube and the inner tube so as to be efficiently heated to a predetermined temperature. The material of the reaction tube 202 and the dispersion plate 203 was Inconel 601.

<Synthesis of CNT>

The reaction tube 202 of the CNT manufacturing apparatus 200 was charged with 1500 g of a catalyst carrier prepared in the same manner as in Example 1. While the catalyst carrier 206 was fluidized by flowing the gases, the formation step, the growth step, and the cooling step were carried out in this order to thereby produce a CNT assembly.

The conditions for each step included in the CNT synthesis process were set as follows.

Formation Step

Reaction temperature: 750° C.

Reducing gases: 40 sLm of nitrogen and 5 sLm of hydrogen

Process time: 35 minutes

Growth Step

Reaction temperature: 750° C.

Source gases: 30 sLm of nitrogen, 8 sLm of ethylene, 2 sLm of carbon dioxide, and 5 sLm of hydrogen Process time: 15 minutes Thermal decomposition time of source gases: 1.3 seconds Cooling Step Cooling temperature: room temperature Purge gas: 45 sLm of nitrogen The CNT assembly synthesized on the catalyst carrier was separated and recovered in the same manner as in Example 1 The recovery rate of the CNT assembly was 99%.

The properties of the CNT assembly produced in this example were as follows: tap bulk density: 0.01 g/cm$^3$, average height of CNTs: 100 μm, BET specific surface area: 800 m$^2$/g, average outer diameter: 4.0 nm, and carbon purity: 99%. Each measurement and evaluation were performed as described above. The results are summarized in Table 1.

Comparative Example

As Comparative Example, a CNT assembly (SG101) manufactured by Zeon Corporation was used. Each measurement and evaluation were performed as described above. The results are summarized in Table 1.

TABLE 1

| | | Example 1 | Example 2 | Comparative Example |
|---|---|---|---|---|
| Condition (1) | FIR resonance peak ($cm^{-1}$) | 830 | 685 | 214 |
| | Effective plasmon length (nm) | 57 | 69 | 221 |
| | Average of ISO area diameter of dispersion (μm) | 121 | 67 | 195 |
| Condition (2) | Presence or absence of peak in differential pore capacity distribution in pore size of 100 to 400 nm | Present | Present | Absent |
| Condition (3) | Presence or absence of peak in spatial frequency spectrum in 1 to 100 $\mu m^{-1}$, or position of peak if present | 3 | 2.5 | Absent |
| | Dispersibility | A | B | C |

It is recognized from Table 1 that the CNT assemblies of Examples 1 to 2 satisfying the conditions (1) to (3) had an excellent dispersibility.

INDUSTRIAL APPLICABILITY

According to the present disclosure, a carbon nanotube assembly which has an excellent dispersibility can be provided.

REFERENCE SIGNS LIST

100, 200 CNT manufacturing apparatus
101, 201 Heater
102, 202 Reaction tube
103, 203 Dispersion plate
104, 204 Reducing gas/raw gas inlet
105, 205 Exhaust vent
106 Gas heating promotion section
107 Catalyst carrier
206 Catalyst carrier

The invention claimed is:

1. A carbon nanotube assembly, the carbon nanotube assembly satisfying at least one of the following conditions (1) to (3):

(1) a spectrum obtained by a Fourier transform infrared spectroscopic analysis on a carbon nanotube dispersion obtained by dispersing the carbon nanotube assembly so that a bundle length is 10 μm or more, has at least one peak based on plasmon resonance of the carbon nanotube dispersion in a wavenumber range of more than 300 $cm^{-1}$ and 2000 $cm^{-1}$ or less;

(2) a highest peak in a differential pore capacity distribution measured on the carbon nanotube assembly is located within a pore size range of more than 100 nm and less than 400 nm; and (3) a two-dimensional spatial frequency spectrum of an electron microscopic image of the carbon nanotube assembly has at least one peak within a range of 1 $\mu m^{-1}$ or more and 100 $\mu m^{-1}$ or less.

2. The carbon nanotube assembly according to claim 1, wherein the at least one peak based on plasmon resonance of the carbon nanotube dispersion is within a wave number range of 500 $cm^{-1}$ or more.

3. The carbon nanotube assembly according to claim 1, wherein the highest peak in the differential pore capacity distribution is 2 $cm^3/g$ or more.

4. The carbon nanotube assembly according to claim 1, wherein at least two of the conditions (1) to (3) are satisfied.

5. The carbon nanotube assembly according to claim 1, wherein all of the conditions (1) to (3) are satisfied.

* * * * *